United States Patent
Harlow

[19]

[11] Patent Number: 5,823,433
[45] Date of Patent: Oct. 20, 1998

[54] WIND GOVERNED SPRINKLER CONTROL SYSTEM

[76] Inventor: Tracy L. Harlow, 5608 Andover, Amarillo, Tex. 79109

[21] Appl. No.: 813,629

[22] Filed: Mar. 7, 1997

[51] Int. Cl.[6] .................................................. A01G 27/00
[52] U.S. Cl. .............................. 239/67; 239/70; 137/78.2; 137/78.5; 73/170.06
[58] Field of Search ................................. 239/67, 69, 70, 239/DIG. 1; 137/78.1, 78.2, 78.5; 73/170.01, 170.05, 170.06, 170.09, 170.14, 170.15, 170.16; 200/61.48, 61.51, 61.52

[56] References Cited

U.S. PATENT DOCUMENTS

| | | | |
|---|---|---|---|
| 1,908,430 | 5/1933 | Lapsley | 200/61.51 X |
| 2,780,937 | 2/1957 | Haynes et al. | 73/170.06 X |
| 3,117,586 | 1/1964 | Cleaver | 137/78.5 |
| 3,361,356 | 1/1968 | Johnson et al. | 137/78.2 |
| 4,050,629 | 9/1977 | Query et al. | 239/67 X |
| 4,072,269 | 2/1978 | Berg | 2389/67 X |
| 4,128,205 | 12/1978 | Coash | 239/177 X |
| 4,697,737 | 10/1987 | Pearce | 239/67 |
| 4,875,498 | 10/1989 | Andrews et al. | 2396/70 X |
| 5,340,025 | 8/1994 | Pearce | 239/70 |

*Primary Examiner*—Andres Kashnikow
*Assistant Examiner*—Stevens J. Ganey

[57] ABSTRACT

A wind governed sprinkler control system including a sprinkler control unit adapted to provide power upon the actuation thereof. A plurality of sprinklers are connected to the sprinkler control unit and adapted to dispense water upon the receipt of power. A wind detection switch is adapted for allowing the transmission of a wind actuation signal upon the detection of wind. Further provided is a first relay mechanism connected between the sprinkler control unit and the sprinklers and adapted to allow the transmission of power to the sprinklers only during the receipt of a first relay activation signal. Associated therewith is a second relay mechansim connected to the sprinkler control unit and adapted to provide power at an output thereof upon the actuation of the sprinkler control unit. Finally, a time delay control mechanism is adapted to deploy to the first relay mechanism a first relay activation signal only upon the receipt of power from the second relay mechanism in combination with a lack of receipt of the wind actuation signal for a predetermined time. Further, the time delay control mechanism is adapted to continue to deploy to the first relay mechanism the first relay activation signal only during the receipt of power in combination with a lack of the wind actuation signal.

4 Claims, 3 Drawing Sheets

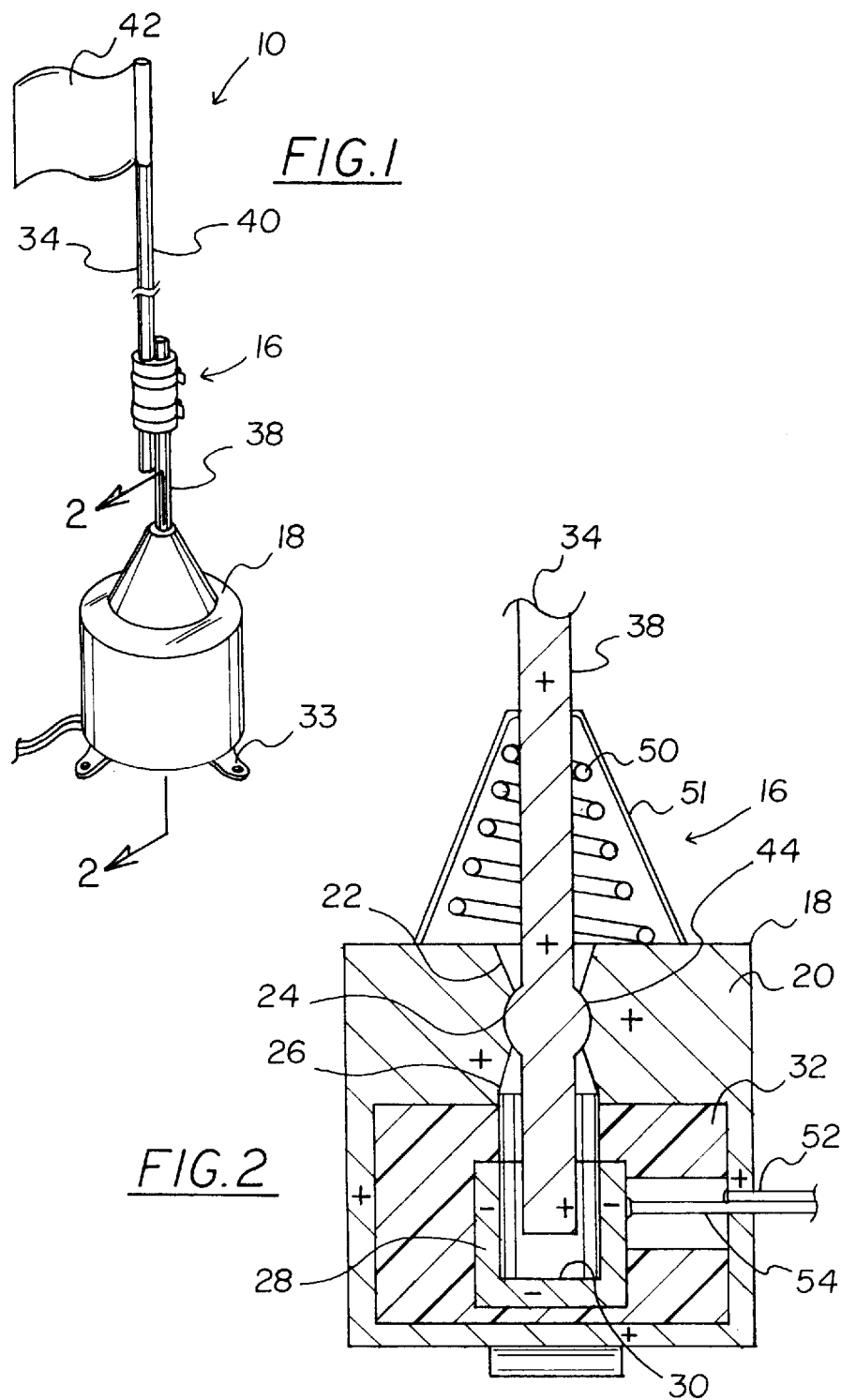

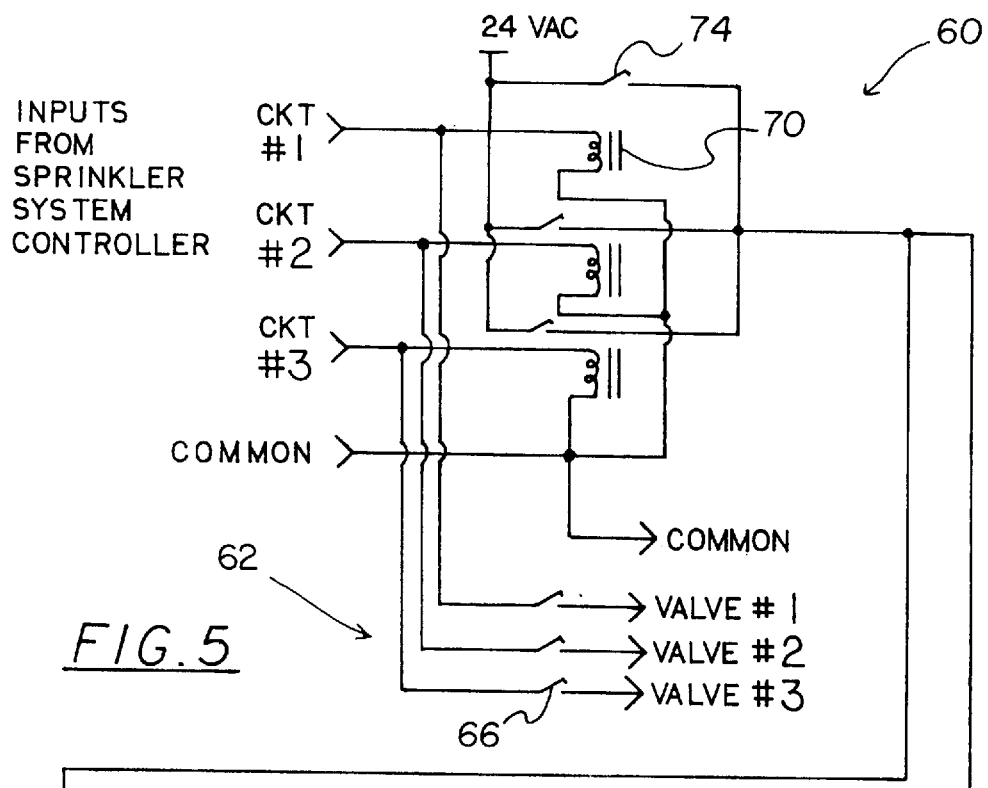
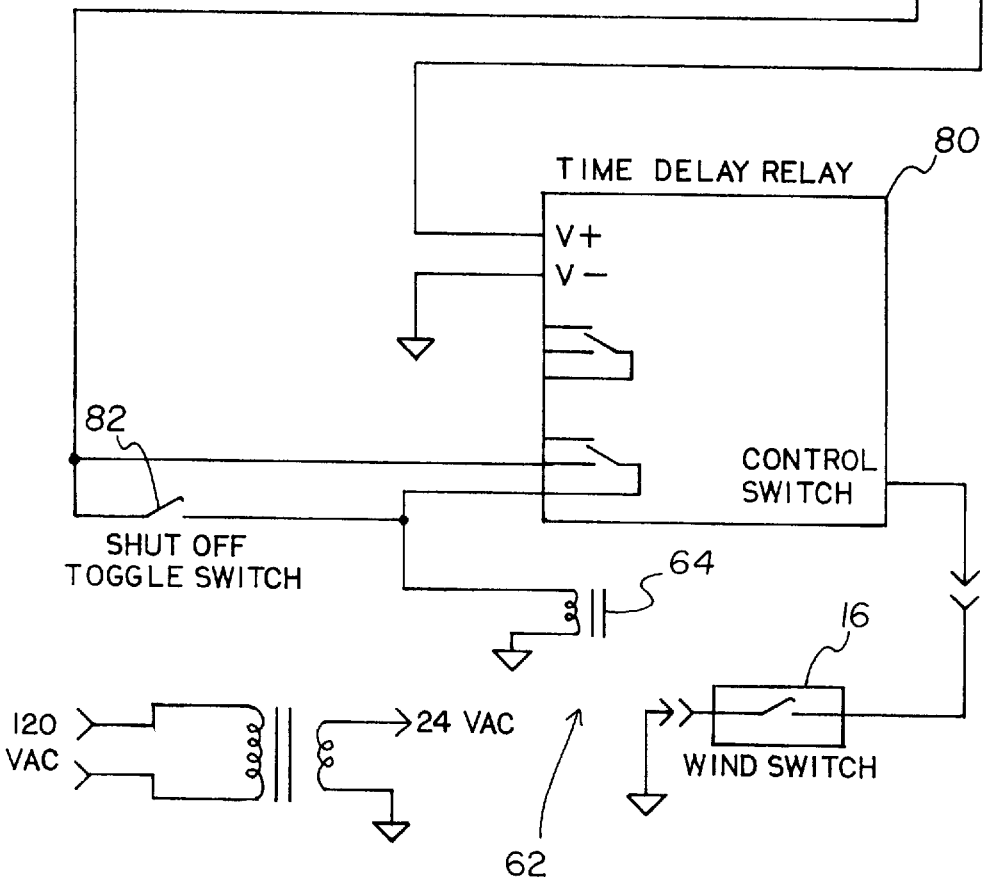
FIG. 5

WIND GOVERNED SPRINKLER CONTROL SYSTEM

BACKGROUND OF THE INVENTION

1. Field of the Invention

The present invention relates to a wind governed sprinkler control system and more particularly pertains to actuating a sprinkler system only if wind is not detected during a predetermined delay.

2. Description of the Prior Art

The use of sprinkler control systems is known in the prior art. More specifically, sprinkler control systems heretofore devised and utilized for the purpose of controlling sprinklers as a function of various parameters are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,340,025 to Pearce; U.S. Pat. No. 5,087,886 to Mann; U.S. Pat. No. 4,128,205 to Coash; U.S. Pat. No. 4,131,133 to Huwe; and U.S. Pat. No. 4,867,603 to Chang.

In this respect, the wind governed sprinkler control system according to the present invention substantially departs from the conventional concepts and designs of the prior art, and in so doing provides an apparatus primarily developed for the purpose of actuating a sprinkler system only if wind is not detected during a predetermined delay.

Therefore, it can be appreciated that there exists a continuing need for a new and improved wind governed sprinkler control system which can be used for actuating a sprinkler system only if wind is not detected during a predetermined delay. In this regard, the present invention substantially fulfills this need.

SUMMARY OF THE INVENTION

In view of the foregoing disadvantages inherent in the known types of sprinkler control systems now present in the prior art, the present invention provides an improved wind governed sprinkler control system. As such, the general purpose of the present invention, which will be described subsequently in greater detail, is to provide a new and improved wind governed sprinkler control system which has all the advantages of the prior art and none of the disadvantages.

To attain this, the present invention essentially comprises a sprinkler control unit adapted to provide power upon the actuation thereof. Associated therewith is a plurality of sprinklers connected to the sprinkler control unit and adapted to dispense water upon the receipt of power. With reference to FIGS. 1 & 2, a wind detection switch is included comprising a cylindrical base having an outer shell constructed from a conductive material. A bore is formed in a top face of the outer shell. As shown in FIG. 2, the bore has a top extent with an inverted frusto-conical configuration, an intermediate extent in communication with the top extent and having a spherical configuration, and a bottom extent in communication with the intermediate extent having a frusto-conical configuration. The cylindrical base further has an internal shell also constructed from a conductive material. The inner shell is situated within the outer shell with a cylindrical bore formed in a top face thereof. Situated between the outer shell and the inner shell is an intermediate shell constructed from an insulative material. Further provided is a toggle flag mechanism having pole constructed from a conductive material. The pole has a lower extent slidably coupled to an upper extent thereof. By this structure, vertical height adjustability is afforded. The upper extent of the pole further has a flag coupled adjacent to a top end thereof. Note FIG. 1. The lower extent further has a sphere joint integrally coupled in a center thereof adjacent to a bottom end thereof. Such structure is for pivotally engaging the intermediate extent of the bore of the outer shell. It should be noted that the lower extent of the flag pole is in electrical communication with the outer shell. As such, the bottom end of the lower extent of the flag has a first vertical orientation for precluding electrical communication between the inner shell and the outer shell upon the absence of wind. Upon the presence of wind, a second slanted orientation is effected for allowing electrical communication between the inner shell and the outer shell thus allowing the transmission of a wind actuation signal. For urging the bottom of the lower extent of the flag pole to the vertical orientation thereof, a coiled spring is included. As shown in FIG. 2, the coiled spring has a top with a first diameter and a bottom with a second diameter greater than the first diameter. To effect proper operation, the bottom of the spring is coupled to the top face of the outer shell of the base and the top of the spring is coupled about the lower extent of the flag pole. Also included is a pair of wires comprising a first wire and second wire. The first wire is connected to the outer shell of the base of the wind switch and the second wire connected to the inner shell of the base of the wind switch. For controlling the operation of the sprinklers, control circuitry is provided. Such control circuitry includes a first relay means connected between the sprinkler control unit and the sprinklers. In use, the first relay means is adapted to allow the transmission of power to the sprinklers only during the receipt of a first relay activation signal. Associated therewith is second relay means connected to the sprinkler control unit. The second relay means is adapted to provide power at an output thereof upon the actuation of the sprinkler control unit. Finally, time delay control means is connected to the output of the second relay means, the wires connected to the wind switch, and the first relay means. The time delay means is adapted for deploying to the first relay means a first relay activation signal only upon the receipt of power in combination with a lack of receipt of the wind actuation signal for a predetermined time. Further, the time delay control means is adapted to continue to deploy to the first relay means the first relay activation signal only during the receipt of power in combination with a lack of the wind actuation signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wind governed sprinkler control system which has all the advantages of the prior art sprinkler control systems and none of the disadvantages.

It is another object of the present invention to provide a new and improved wind governed sprinkler control system which may be easily and efficiently manufactured and marketed.

It is a further object of the present invention to provide a new and improved wind governed sprinkler control system which is of a durable and reliable construction.

An even further object of the present invention is to provide a new and improved wind governed sprinkler control system which is susceptible of a low cost of manufacture with regard to both materials and labor, and which accordingly is then susceptible of low prices of sale to the consuming public, thereby making such wind governed sprinkler control system economically available to the buying public.

Still yet another object of the present invention is to provide a new and improved wind governed sprinkler control system which provides in the apparatuses and methods of the prior art some of the advantages thereof, while simultaneously overcoming some of the disadvantages normally associated therewith.

Still another object of the present invention is to actuate a sprinkler system only if wind is not detected during a predetermined delay.

Lastly, it is an object of the present invention to provide a new and improved wind governed sprinkler control system including a sprinkler control unit adapted to provide power upon the actuation thereof. A plurality of sprinklers are connected to the sprinkler control unit and adapted to dispense water upon the receipt of power. A wind detection switch is adapted for allowing the transmission of a wind actuation signal upon the detection of wind. Further provided is a first relay mechanism connected between the sprinkler control unit and the sprinklers and adapted to allow the transmission of power to the sprinklers only during the receipt of a first relay activation signal. Associated therewith is a second relay mechanism connected to the sprinkler control unit and adapted to provide power at an output thereof upon the actuation of the sprinkler control unit. Finally, a time delay control mechanism is adapted deploy to the first relay mechanism a first relay activation signal only upon the receipt of power from the second relay mechanism in combination with a lack of receipt of the wind actuation signal for a predetermined time. Further, the time delay control mechanism is adapted to continue to deploy to the first relay mechanism the first relay activation signal only during the receipt of power in combination with a lack of the wind actuation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the wind governed sprinkler control system constructed in accordance with the principles of the present invention.

FIG. 2 is a cross-sectional view of the base of the wind switch of the present invention.

FIG. 5 is a detailed schematic of the interconnection of various components of the control circuitry.

Similar reference characters refer to similar parts throughout the several views of the drawings.

DESCRIPTION OF THE PREFERRED EMBODIMENT

Figure 3:
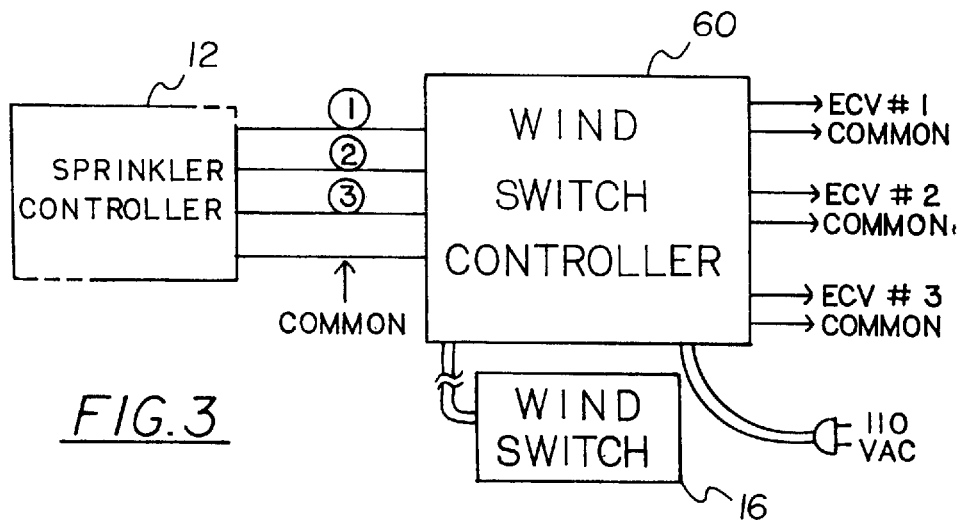
FIG. 3 is a general block diagram depicting the sprinkler control unit, wind switch, and control circuitry of the present invention.
Figure 4:
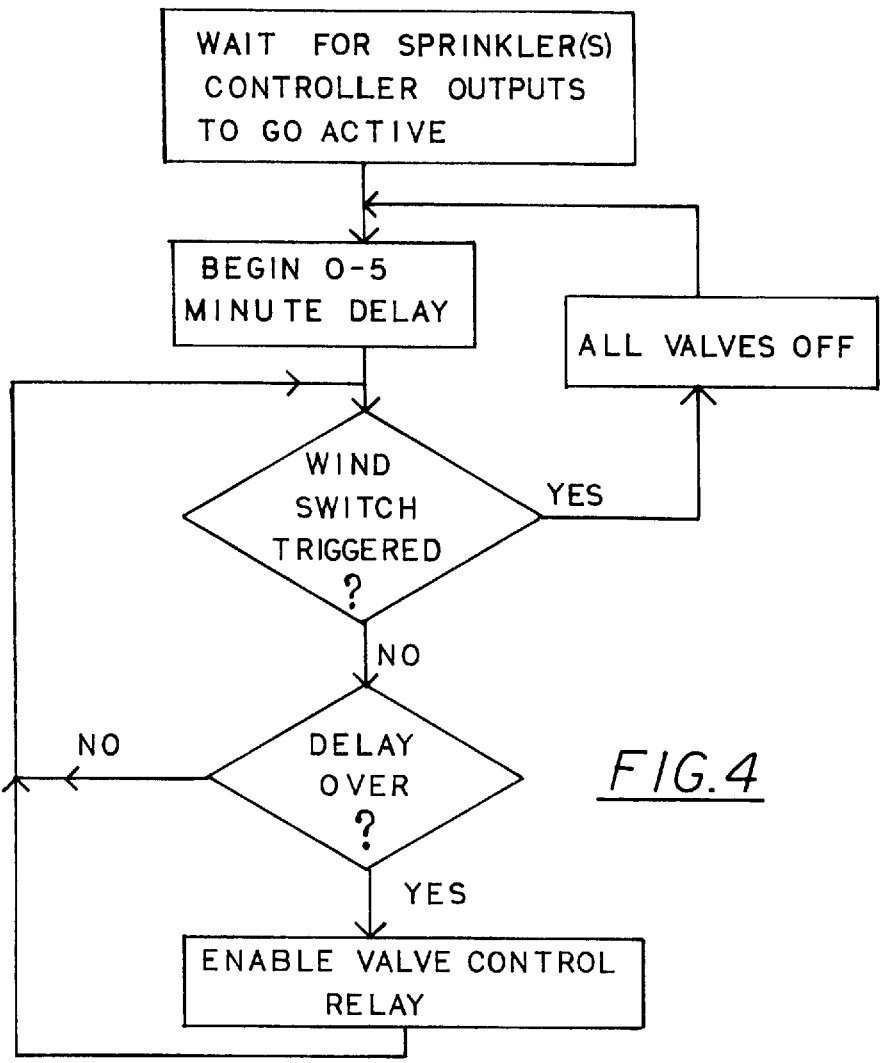
FIG. 4 is a flow chart showing the function afforded by the control circuitry of present invention.

With reference now to the drawings, and in particular to FIG. 1 thereof, a new and improved wind governed sprinkler control system embodying the principles and concepts of the present invention and generally designated by the reference numeral 10 will be described.

The present invention, the new and improved wind governed sprinkler control system, is comprised of a plurality of components. Such components in their broadest context include a sprinkler control unit, sprinklers, wind switch, first relay means, second relay means, and time delay control means. Such components are individually configured and correlated with respect to each other so as to attain the desired objective.

More specifically, it will be noted that the system 10 of the present invention includes a sprinkler control unit 12 adapted to provide power upon the actuation thereof. Associated therewith is a plurality of sprinklers connected to the sprinkler control unit and adapted to dispense water upon the receipt of power.

With reference to FIGS. 1 & 2, a wind detection switch 16 is included comprising a cylindrical base 18 having an outer shell 20 constructed from a conductive material. A bore is formed in a top face of the outer shell. As shown in FIG. 2, the bore has a top extent 22 with an inverted frusto-conical configuration, an intermediate extent 24 in communication with the top extent and having a spherical configuration, and a bottom extent 26 in communication with the intermediate extent and having a frusto-conical configuration. The cylindrical base further has an internal shell 28 also constructed from a conductive material. The inner shell is situated within the outer shell with a cylindrical bore 30 formed in a top face thereof which has a diameter greater than or equal to that of the largest diameter of the bottom extent 26 of the bore. Situated between the outer shell and the inner shell is an intermediate shell 32 constructed from an insulative material. As shown in FIG. 2, a bore is formed in a top face of the insulative intermediate shell for allowing communication between the bores of the outer and inner shells. To allow the base to be secured to a recipient surface, a plurality of eyelets 33 are formed about a lower periphery thereof.

Further provided is a toggle flag mechanism 34 having pole 36 constructed from a conductive material. The pole has a lower extent 38 slidably coupled to an upper extent 40 thereof. Such slidable coupling is afforded by a cylindrical bushing with associated clamps for maintaining the upper and lower extent in a parallel relationship. See FIG. 1. By this structure, vertical height adjustability is afforded and the amount of wind that is needed to tilt the flag is selectively determined by a user. The upper extent of the pole further has a flag 42 coupled adjacent to a top end thereof. Note FIG. 1. Such flag is preferably 4 inches in height and 5 inches in width. The lower extent further has a sphere joint 44 integrally coupled in a center thereof adjacent to a bottom end thereof. Such structure is for pivotally engaging the intermediate extent of the bore of the outer shell. It should be noted that the lower extent of the flag pole is in electrical communication with the outer shell. As such, the bottom end of the lower extent of the flag has a first vertical orientation, as shown in FIG. 2, for precluding electrical communication between the inner shell and the outer shell upon the absence of wind. Upon the presence of wind, a second slanted orientation is effected for allowing electrical communication between the inner shell and the outer shell thus allowing the transmission of a wind actuation signal. A tilt of 15 degrees is required for allowing electrical communication. To allow proper toggling of the flag pole, it is imperative that the diameter of the pole be significantly less than the bores of the outer and inner shells.

For urging the bottom of the lower extent of the flag pole to the vertical orientation thereof, a coiled spring 50 is included. As shown in FIG. 2, the coiled spring has a top with a first diameter and a bottom with a second diameter greater than the first diameter. To effect proper operation, the bottom of the spring is coupled to the top face of the outer shell of the base and the top of the spring is coupled about the lower extent of the flag pole. It should be noted that the coiled spring is preferably wrapped in a plastic flexible sheath 51 to prevent the corrosion thereof.

Also included is a pair of wires comprising a first wire 52 and second wire 54. The first wire is connected to the outer shell of the base of the wind switch and the second wire is connected to the inner shell thereof.

For controlling the operation of the sprinklers, control circuitry 60 is provided. Such control circuitry includes a first relay means 62 connected between the sprinkler control unit and the sprinklers. In use, the first relay means is adapted to allow the transmission of power to the sprinklers only during the receipt of a first relay activation signal. To accomplish this, the first relay means includes at least one first relay coil 64 adapted to actuate upon the receipt of the first relay activation signal. See FIG. 5. Further, the first relay means includes a plurality of first relay contacts 66 which are each connected between the sprinkler control unit and the corresponding sprinkler. Such contacts are adapted to close and allow the transmission of power only upon the actuation of the first relay coil.

Associated therewith is a second relay means connected to the sprinkler control unit. The second relay means is adapted to provide power at an output thereof upon the actuation of the sprinkler control unit. Ideally, such power has an associated voltage of approximately 24 Volts. To accomplish the foregoing, at least one second relay coil 70 is connected to the sprinkler control unit and is adapted to actuate upon the receipt of power from the sprinkler control unit. Also included is at least one second relay contact 74 connected to a power source (24 V) and adapted to close and supply power only upon the actuation of the second relay coil.

Finally, a time delay control means 80 is connected to the output of the second relay contact of the second relay means.

The time delay control means 80 is further connected to the wind switch via the wires and the first relay coil of the first relay means. The time delay means is adapted for deploying to the first relay coil of the first relay means a first relay activation signal only upon the receipt of power from the second relay contact in combination with a lack of receipt of the wind actuation signal for a predetermined time. Such predetermined amount of time is ideally between 0–5 minutes. Further, the time delay control means is adapted to continue to deploy to the first relay coil the first relay activation signal only during the receipt of power from the second relay contact in combination with a lack of the wind actuation signal. Upon the receipt of the wind actuation signal and the continued actuation of the sprinkler control unit, the time control means is adapted to deploy to the first relay coil of the first relay means a first relay activation signal only upon the lack of receipt of the wind actuation signal for a predetermined time. If for any reason, a user wishes to override the delay, a toggle switch 82 may be flipped to effect operation of the sprinklers independent of the wind.

The method in which the sprinklers are governed is afforded by the amalgamation of the foregoing components and further the specific function of the time delay means of the control circuitry. First, the system awaits the actuation of the sprinkler control unit and the power thereby afforded. Next, upon such actuation, a predetermined amount of delay is initiated during which if the wind actuation signal is received, the delay is again initiated, or repeated. Upon the cessation of the delay and the lack of receipt of the wind actuation signal, power is afforded to the sprinklers and they operate as normal unless the wind actuation signal is received whereat the delay is again initiated. It should be understood that the foregoing process continues as long as power is being supplied by the sprinkler control unit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved wind governed sprinkler control system comprising, in combination:

a sprinkler control unit adapted to provide power upon the actuation thereof;

a plurality of sprinklers connected to the sprinkler control unit and adapted to dispense water upon the receipt of power;

a wind detection switch including a cylindrical base having an outer shell constructed from a conductive material with a bore formed in a top face thereof, the bore having a top extent having an inverted frustoconical configuration, an intermediate extent in communication with the top extent and having a spherical configuration, and a bottom extent in communication with the intermediate extent having a frusto-conical configuration, the cylindrical base further having an internal shell constructed from a conductive material, the inner shell being situated within the outer shell with a cylindrical bore formed in a top face thereof, the cylindrical base also including an intermediate shell constructed from an insulative material and situated between the outer shell and the inner shell;

a toggle flag mechanism having a pole constructed from a conductive material with a lower extent slidably coupled to an upper extent thereof for affording vertical height adjustability, the upper extent of the pole having a flag coupled adjacent to a top end thereof, the lower extent having a sphere joint integrally coupled in a center thereof adjacent to a bottom end thereof for pivotally engaging the intermediate extent of the bore of the outer shell and further in electrical communication therewith whereby the bottom end of the lower extent of the flag has a first vertical orientation for precluding electrical communication between the inner shell and the outer shell upon the absence of wind and a second slanted orientation for allowing electrical communication between the inner shell and the outer shell upon the presence of wind thus allowing the transmission of a wind actuation signal;

a coiled spring having a top with a first diameter and a bottom with a second diameter greater than the first diameter, the bottom of the spring coupled to the top face of the outer shell of the base, the top of the spring coupled about the lower extent of the flag pole for urging the bottom of the lower extent of the flag pole to the vertical orientation thereof;

a pair of wires including a first wire connected to the outer shell of the base of the wind switch and a second wire connected to the inner shell of the base of the wind switch;

first relay means connected between the sprinkler control unit and the sprinklers and adapted to allow the transmission of power to the sprinklers only during the receipt of a first relay activation signal;

second relay means connected to the sprinkler control unit and adapted to provide power at an output thereof upon the actuation of the sprinkler control unit; and time delay control means connected to the output of the second relay means, the wires connected to the wind switch, and the first relay means, the time delay means adapted to deploy to the first relay means a first relay activation signal only upon the receipt of power in combination with a lack of receipt of the wind actuation signal for a predetermined time, the time delay control means further adapted to continue to deploy to the first relay means the first relay activation signal only during the receipt of power in combination with a lack of the wind actuation signal.

2. A wind governed sprinkler control system comprising:

a sprinkler control unit adapted to provide power upon the actuation thereof;

a plurality of sprinklers connected to the sprinkler control unit and adapted to dispense water upon the receipt of power;

a wind detection switch including a cylindrical base having an outer shell constructed from a conductive material with a bore formed in a top face thereof, the bore having a top extent having an inverted frustoconical configuration, an intermediate extent in communication with the top extent and having a spherical configuration, and a bottom extent in communication with the intermediate extent having a frusto-conical configuration, the cylindrical base further having an internal shell constructed from a conductive material, the inner shell being situated within the outer shell with a cylindrical bore formed in a top face thereof, the cylindrical base also including an intermediate shell constructed from an insulative material and situated between the outer shell and the inner shell;

a toggle flag mechanism having a pole constructed from a conductive material with a lower extent and an upper extent, the upper extent of the pole having a flag coupled adjacent to a top end thereof, the lower extent having a sphere joint integrally coupled in a center thereof adjacent to a bottom end thereof for pivotally engaging the intermediate extent of the bore of the outer shell and further in electrical communication therewith whereby the bottom end of the lower extent of the flag has a first vertical orientation for precluding electrical communication between the inner shell and the outer shell upon the absence of wind and a second slanted orientation for allowing electrical communication between the inner shell and the outer shell upon the presence of wind thus allowing the transmission of a wind actuation signal;

spring means for urging the bottom of the lower extent of the flag pole to the vertical orientation thereof;

a pair of wires including a first wire connected to the outer shell of the base of the wind switch and a second wire connected to the inner shell of the base of the wind switch; and control circuitry connected between the sprinkler control unit and the control means and further connected to the wind switch via the wires, the control circuitry adapted to allow the transmission of power to the sprinklers only upon the lack of receipt of the wind actuation signal.

3. A wind governed sprinkler control system as set forth in claim 2 wherein the control circuitry includes:

first relay means connected between the sprinkler control unit and the sprinklers and adapted to allow the transmission of power to the sprinklers only during the receipt of a first relay activation signal;

second relay means connected to the sprinkler control unit and adapted to provide power at an output thereof upon the actuation of the sprinkler control unit; and time delay control means connected to the output of the second relay means, the wires connected to the wind switch, and the first relay means, the time delay means adapted to deploy to the first relay means a first relay activation signal only upon the receipt of power in combination with a lack of receipt of the wind actuation signal for a predetermined time, the time delay control means further adapted to continue to deploy to the first relay means the first relay activation signal only during the receipt of power in combination with a lack of the wind actuation signal.

4. A wind governed sprinkler control system as set forth in claim 2 wherein the lower extent and upper extent of the flag pole are slidably coupled for allowing vertical adjustability.

* * * * *